(No Model.)

A. H. BRAINARD.
MILLING MACHINE.

No. 381,108. Patented Apr. 17, 1888.

WITNESSES.

INVENTOR.

UNITED STATES PATENT OFFICE.

AMOS H. BRAINARD, OF HYDE PARK, MASSACHUSETTS.

MILLING-MACHINE.

SPECIFICATION forming part of Letters Patent No. 381,108, dated April 17, 1888.

Application filed October 6, 1885. Serial No. 179,131. (No model.)

*To all whom it may concern:*

Be it known that I, AMOS H. BRAINARD, a citizen of the United States, residing in Hyde Park, in the county of Norfolk and State of Massachusetts, have invented a new and useful Improvement in Chip-Conveyers for Milling-Machines, of which the following is a specification.

My invention relates to an automatic device for removing the chips which accumulate under the cutters of milling and gear-cutting machines; and it consists of a series of elliptical blades secured diagonally to a shaft or spindle and revolving with said shaft or spindle. These blades are of peculiar construction, as will be seen by reference to the accompanying drawings. They are made preferably of sheet-steel, but may be made of any cast metal; or they may be cast solid with the shaft or spindle. A conveyer-screw has been employed for this purpose; but it is impossible to use it when cutting wrought-iron or steel, as it will become clogged under these conditions. A series of buckets hinged on a carrier and pushed longitudinally to and fro has also been used; but this device is open not only to the same objection as the screw, but, as the buckets must swing loosely on the carrier in order to drop back automatically, the dust from cast-iron chips soon fills their bearings and the device becomes inoperative.

Any clearing device that remains constantly in the chips is sure to foul and become inoperative in a short time. In my invention, however, this difficulty is obviated, as the blades are of such shape that they alternately dip into and are raised bodily out of the chips at each revolution of the shaft or spindle to which they are secured. At each revolution of the shaft or spindle each blade moves the chips to within reach of the blade in front of it, then is swung or lifted out of the chips before that revolution of the shaft or spindle is completed.

Figure 1:
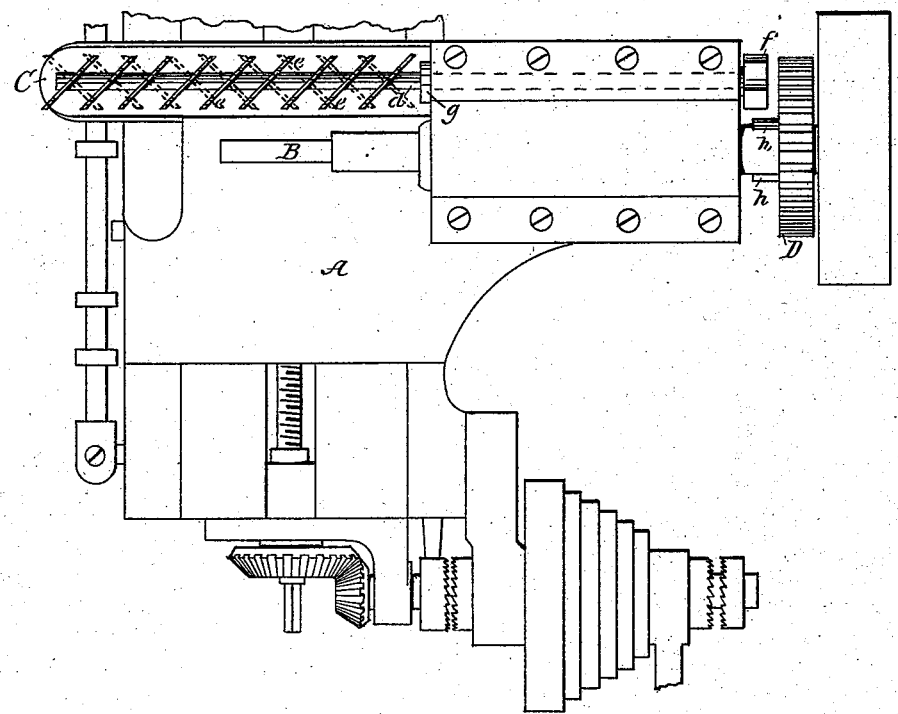
Figure 2:
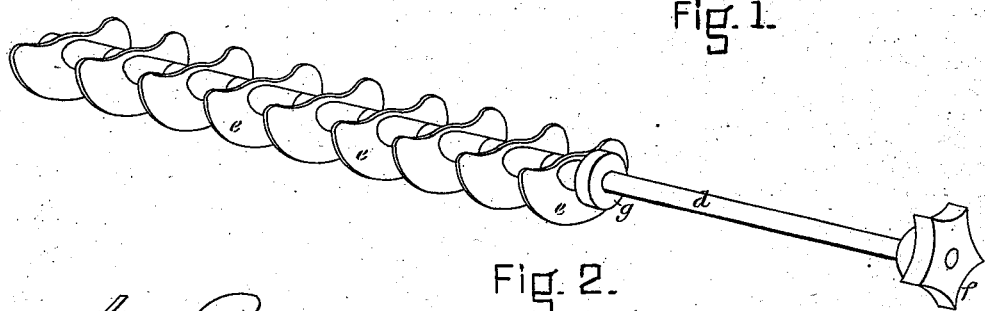
Figure 3:
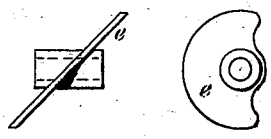
Figure 4:
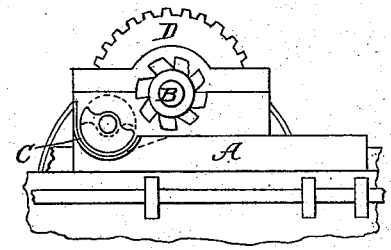

In the accompanying drawings, Figure 1 is a plan of the carriage of a gear-cutting machine, essentially the same as in the patent granted me January 6, 1885, No. 310,247, and shows my device as in operation, the cutting-tool being removed. Fig. 2 is a perspective view of my device in detail and on an enlarged scale. Fig. 3 is a plan and end elevation of one of the blades, showing the angle at which the blades are set. Fig. 4 is a side elevation of the carriage of a gear-cutting machine, showing the blades in and out of the chips, the latter position shown in dotted lines. The cutter is shown in this view.

Similar letters refer to similar parts in the several views.

A is the cutter-carriage of a gear-cutting machine.

B is the cutter-arbor, the cutter being removed in Fig. 1 the better to show my device.

C is the spout or groove in which the chips collect as they drop from the cutter. Extending the entire length of this spout C, but not coming in contact with it at any point, is my device, consisting of the shaft or spindle $d$, to which are secured, at an angle of about forty-five degrees, the blades $e$ $e$ $e$, &c., the shaft or spindle being held in place in its bearing by means of the star-wheel $f$ and the collar $g$. To the spur-wheel D are secured pins $h$ $h$, which, as the said spur-wheel D revolves, come in contact alternately with the teeth of the star-wheel $f$, imparting to the latter, and through it to the shaft or spindle $d$ and the blades $e$ $e$ $e$, &c., an intermittent motion, which is found in practice to be much better than a continuous one, the rotation being slow, while the movement of the clearing-blades is quick, thus lessening the friction, while increasing efficiency.

It will be noted that the clearer, being actuated from the cutter-shaft, rotates always in the same direction, and is constantly at work moving the chips toward the outlet, notwithstanding the reversal of the feed-screw and backward movement of the cutter-carriage after the cutting of each tooth in the gear-blank.

It is to be distinctly understood that my chip-clearer, as illustrated in Fig. 2, differs from a worm in construction, mode of operation, and in result. The worm, as used for conveyers, is formed by a continuous spiral vane like the thread of a screw, the continuity of the vane being, however, often interrupted by spaces circumferentially distributed, these spaces resulting from the fact that the vane is built up out of a series of flights. The action of such worm-vane is continuous throughout the revolution of the worm. Such a worm clogs when it attempts the handling of wrought-iron or steel cuttings and becomes totally inoperative.

My chip-clearer, as illustrated in Fig. 2, consists of a series of vanes arranged parallel to each other and oblique to the axis of their shafts, said vanes extending through a portion only of the circumference of the circle swept by the periphery of the vane. The advance point of one vane is axially in advance of the heel of the vane immediately in front of it. There is thus no continuity of vane. In operation these oblique vanes do not act to produce a continuous procession of the chips, but each vane takes stationary chips as it finds them and advances them and leaves them stationary within reach of the next vane, which does not reach the chips until they have been some time stationary. My improved clearer handles wrought-iron and steel cuttings with facility—a result not attained by any device of which I have knowledge.

Having thus described the nature, construction, and operation of my invention, I wish to secure by Letters Patent and claim as follows:

1. In a chip-clearer for milling and gear-cutting machines, the combination, substantially as set forth, with a machine part on which the chips fall, a gutter therein to receive the chips, a bearing for the support of a rotary clearer-shaft, and means for rotating such shaft, of a series of vanes, $e$, formed with or secured to such shaft, said vanes being arranged parallel to each other and oblique to the axis of their shaft, the vanes corresponding to a portion only of the clearer-circle, so that one longitudinal side of the clearer is free from vanes, whereby when the clearer-shaft is so turned that the vanes project upwardly from the shaft no vanes will project downwardly into the chip-trough.

2. In a gear-cutting or milling machine, the combination, substantially as set forth, with a machine part on which the chips fall, a trough therein to receive the chips, a bearing for the support of the clearer-shaft, and means for giving intermittent rotation to such clearer-shaft, of a clearer-shaft, $d$, provided with a longitudinal series of vanes, $e$, arranged parallel to each other and oblique to the axis of said shaft, the vanes filling a portion only of the clearer-circle.

AMOS H. BRAINARD.

In presence of—
JEREMIAH CORBETT,
ALONZO H. RICHARDSON.